United States Patent
Lahr et al.

(10) Patent No.: US 9,951,853 B2
(45) Date of Patent: Apr. 24, 2018

(54) LONG TRAVEL DAMPER USING A CLOCKSPRING

(71) Applicant: GM Global Technology Operations LLC, Detroit, MI (US)

(72) Inventors: Derek F. Lahr, Howell, MI (US); Farzad Samie, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 14/990,033

(22) Filed: Jan. 7, 2016

(65) Prior Publication Data
US 2017/0198794 A1    Jul. 13, 2017

(51) Int. Cl.
| *F16H 45/02* | (2006.01) |
| *F16D 25/0635* | (2006.01) |
| *F16F 1/10* | (2006.01) |
| *F16F 15/121* | (2006.01) |

(52) U.S. Cl.
CPC ............... *F16H 45/02* (2013.01); *F16F 1/10* (2013.01); *F16F 15/1213* (2013.01); *F16H 2045/0221* (2013.01)

(58) Field of Classification Search
None
See application file for complete search history.

(56) References Cited

U.S. PATENT DOCUMENTS

| 4,181,208 A | * | 1/1980 | Davis | F16D 3/52 |
| | | | | 192/207 |
| 4,768,637 A | * | 9/1988 | Bopp | F16F 15/1213 |
| | | | | 192/208 |
| 5,234,376 A | * | 8/1993 | Chimner | F16F 15/1213 |
| | | | | 192/207 |
| 5,240,457 A | * | 8/1993 | Leichliter | F16F 15/161 |
| | | | | 192/208 |

FOREIGN PATENT DOCUMENTS

FR    2611013 A1  *  8/1988    .......... F16F 15/1213

* cited by examiner

*Primary Examiner* — Jacob S. Scott
(74) *Attorney, Agent, or Firm* — Lorenz & Kopf, LLP

(57) ABSTRACT

A product may include a power source and a power transmission system. A coupling may be connected between the power source and the power transmission system. An engagement mechanism in the coupling may selectively provide a connection between the power source and the power transmission system. A damper may be included in the engagement mechanism through which the connection may be communicated. The damper may comprise a number of coils and may have a first end connected to the power source through the engagement mechanism and may have a second end connected to the power transmission system.

20 Claims, 3 Drawing Sheets

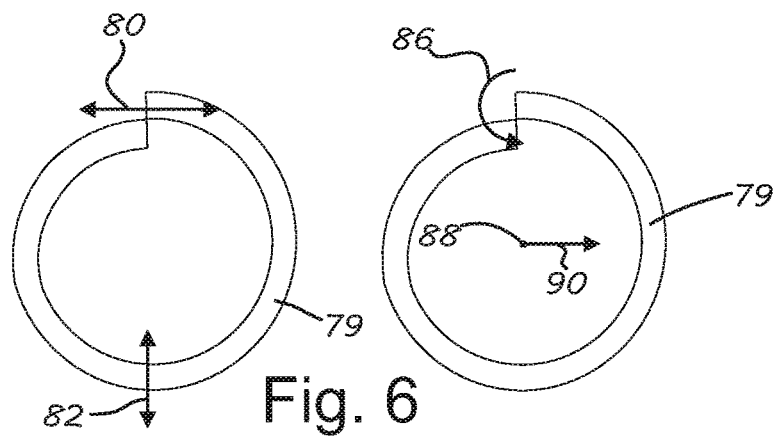
Fig. 6
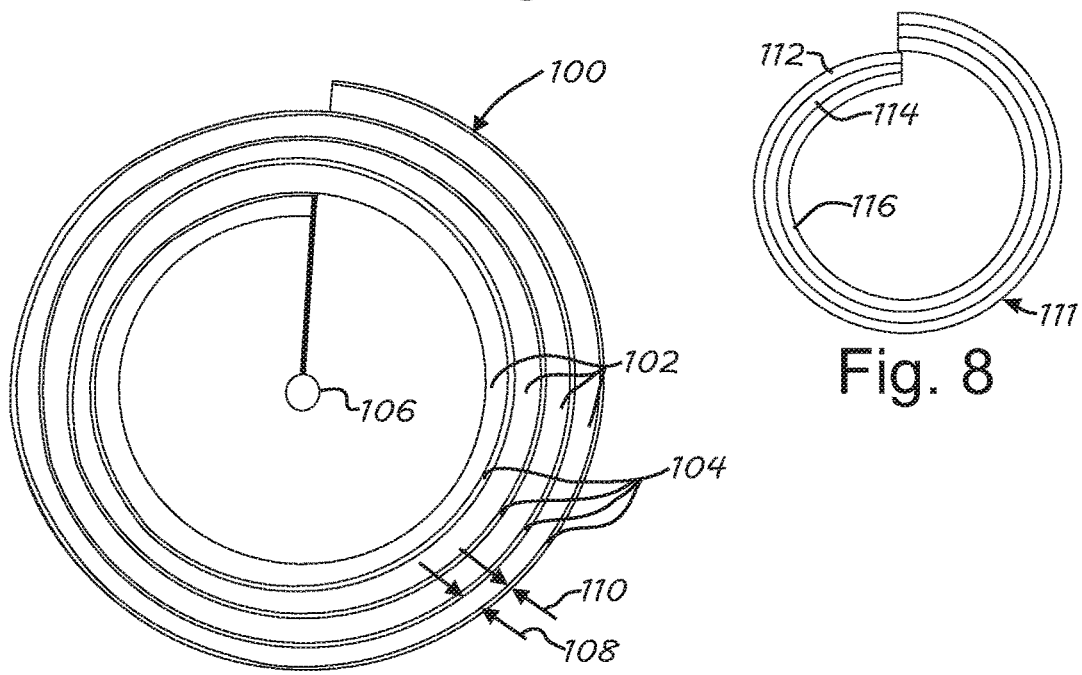
Fig. 7
Fig. 8
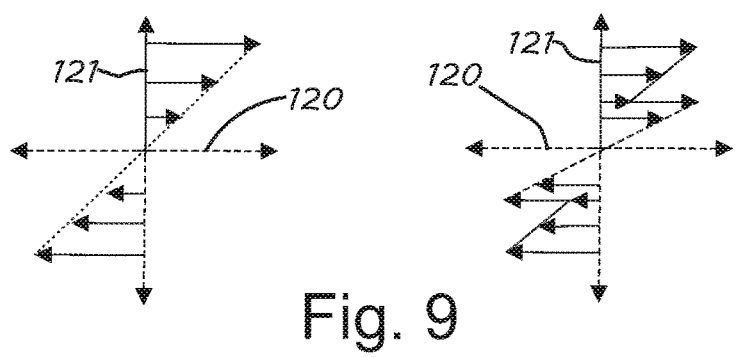
Fig. 9

LONG TRAVEL DAMPER USING A CLOCKSPRING

TECHNICAL FIELD

The field to which the disclosure generally relates includes couplings, and in particular includes torsional isolation dampers in couplings.

BACKGROUND

A coupling may be used between a power source and a loaded power transmission system. The coupling may transfer rotating power from the power source to the load. Torsional vibrations may be generated between the power source and the power transmission system. Attenuation of those torsional vibrations may be desirable.

SUMMARY OF ILLUSTRATIVE VARIATIONS

A number of illustrative variations may involve a product that may include a power source and a power transmission system. A coupling may be connected between the power source and the power transmission system. An engagement mechanism in the coupling may selectively provide a connection between the power source and the power transmission system. A damper may be included in the engagement mechanism through which the connection may be communicated. The damper may comprise a number of coils and may have a first end connected to the power source through the engagement mechanism and may have a second end connected to the power transmission system.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 6 is a diagram of potential motions of a coil of a product.

FIG. 7 is a schematic illustration of part of a product according to a number of variations.

FIG. 8 is a schematic illustration of part of a product according to a number of variations.

FIG. 9 is an illustration of a pair of stress diagrams according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
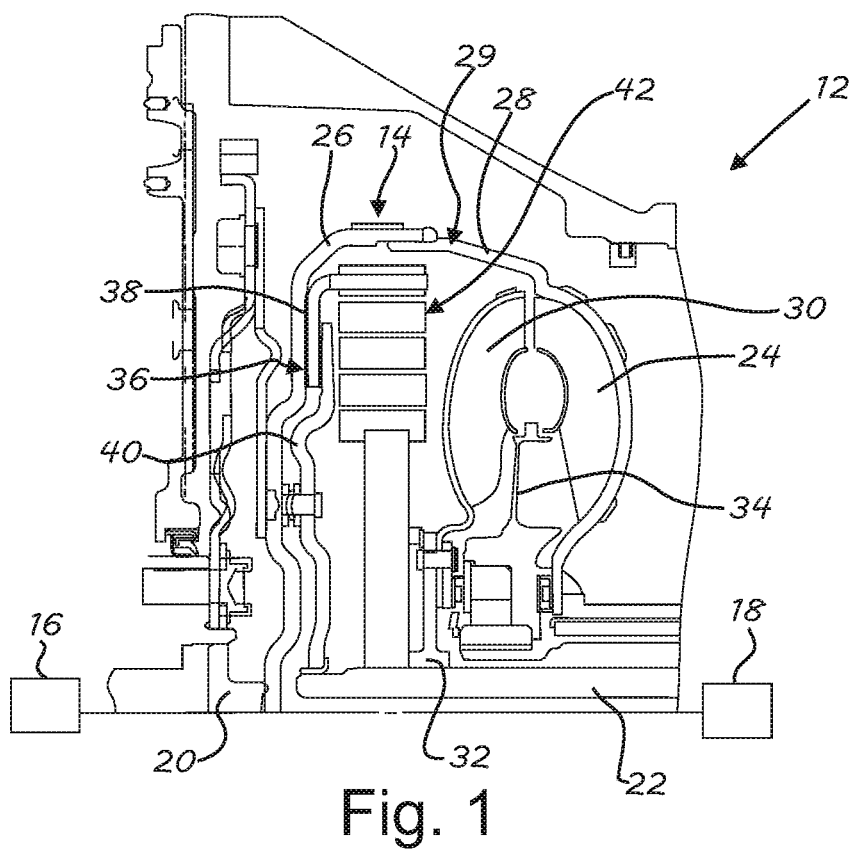
FIG. 1 is a partial schematic sectional illustration of a product according to a number of variations.

In the transmission of torque from a power source, the attenuation of vibrations may be desirable or necessary. For example, in an application involving a vehicle with an internal combustion engine connected to a transmission and driveline through a torque converter, it has been found that a tailored attenuation of vibrations may enable broader clutch lockup and improved efficiency. In particular, a product 12 as illustrated in FIG. 1, may include a coupling 14. The coupling 14 may be connected between a power source 16 and a power transmission system 18. In a number of variations the power source 16 may be an internal combustion engine of the type used in automobiles for propulsion. In a number of variations the power transmission system 18 may include a multi-speed transmission and driveline to transfer power to propel the vehicle. In a number of variations the power transmission system may involve another type of power source and/or another type of power transmission system. In a number of variations the coupling 14 may be a torque converter connected between an engine and a transmission.

In a number of variations the coupling 14 may be connected with the power source 16 through an input shaft 20, and may be connected to the power transmission system 18 through an output shaft 22. The input shaft 20 may be connected with an impeller 24 through a first housing section 26 and a second housing section 28. The housing sections 26, 28 may form a housing 29 that may contain a fluid through which the coupling 14 may transfer torque. The output shaft 22 may be connected with a turbine 30 through a torque transfer element 32. A stator 34 may be positioned between the impeller 24 and the turbine 30 and may effect an increase in output torque through the coupling 14. Rotation of the impeller 24 may move fluid to rotate the turbine 30 so that the output shaft 22 is driven by the input shaft 20.

In a number of variations the coupling 14 may include a lockup clutch 36 that may be applied as the speed of the turbine 30 approaches the speed of the impeller 24 so that a mechanical link, which may be a fixed connection, is established between the input shaft 20 and the output shaft 22. A friction plate 38 may be provided on a piston 40. When actuated, the piston 40 may apply pressure between the friction plate 38 and the housing section 26 so that the piston 40 rotates with the housing section 26 and the input shaft 20. The piston 20 may be connected to the output shaft 22 through a damper 42.

Figure 2:
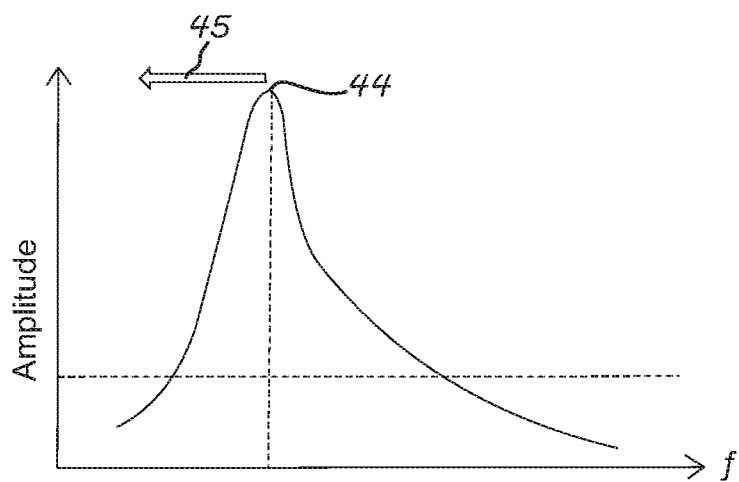
FIG. 2 is a graph of amplitude versus frequency for a product according to a number of variations.

The damper 42 may be included because the power source 16 and a power transmission system 18 may be a system with a resonance point where the excitation of firing pulses, such as from an internal combustion engine, may result in vibration spikes in the power transmission system 18 that may be perceived in the associated vehicle. The damper 42 may be advantageously designed to enable lockup of the lockup clutch 36 over an extended range of operating conditions. More specifically, the damper 42 may have a low spring rate (K), to tailor the resonance point of what may be referred to as a damper mode, to a selected frequency. With reference to FIG. 2, where amplitude is depicted on the y-axis, the resonance point 44 (peak amplitude), may be moved to a desirable location, such as to the left 45 on the frequency scale (x-axis). The resonance point 44 may be moved to a desirable point, such as to a frequency corresponding to below 1000 revolutions per minute. By reducing the value of K in the equation: $f=\frac{1}{2}\pi\sqrt{K/I}$, where I is the moment of inertia or angular mass, the frequency (f) at which a peak vibration (resonance point 44), occurs will be reduced. Moving this peak vibration to the left, enables locking the lockup clutch at a lower speed of the power source 16. For example lockup may be effected between 1000 and 1100 revolutions per minute, which may be above the peak vibration 44. The low speed lockup may result in fuel economy improvements since the lockup occurs sooner and the coupling with lockup operates most efficiently. A reduction in stiffness with the lower spring rate means the damper 42 must operate with additional compression, or travel, to handle the same amount of torque. A longer travel damper 42 may be accomplished with a clockspring type damper. The damper 42 may have a long travel (>90 degrees), with low spring rates.

Figure 3:
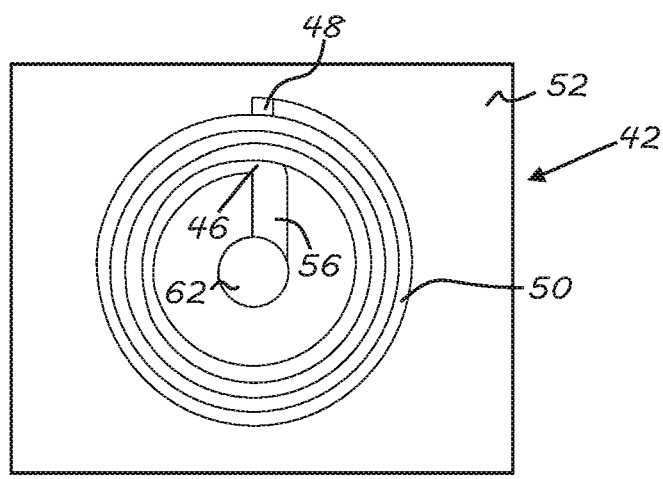
FIG. 3 is a schematic illustration of part of a product according to a number of variations.

In a number of variations as illustrated in FIG. 3, the damper 42 may be a clockspring with an inner end 46, an outer end 48 and a length 50 extending in between the inner end 46 and the outer end 48, and wound in a spiral shape from the inner end 46 to the outer end 48. The length 50 may be disposed in the plane 52 of the view illustrated such as by a series of individual coils wound around each other. The damper 42 may be comprised of a material with a constant spring rate such as carbon fiber. With additional reference to FIG. 4, the inner end 46 may be connected with a torque transfer element 56, and may include a pin 58 that may be received in an opening 60 in the torque transfer element 56. The torque transfer element 56 may be connected with a shaft, such as the output shaft 22 of FIG. 1, which may provide a first connection between the power source 16 and the power transmission system 18. Similarly, the outer end 48 may be connected with another torque transfer element 64 and may include a pin 65 that may be received in an opening 68 in the torque transfer element 64. Instead of the pins 58, 65, the damper 42 may be connected through welds or other fastening techniques, and may include connections along the length 50 of the coils of the damper 42. The torque transfer element 64 may be connected with an element, such as the piston 40 of FIG. 1, (directly or indirectly), which may provide a second connection between the power source 16 and the power transmission system 18. In operation between the power source 16 and the power transmission system 18, when the piston 40 is moved to compress the friction plate 38 against the housing section 26, through the first and second connections the torque transfer element 64 will wind the length 50 providing dampening as the torque transfer element 56 is driven.

Figure 5:
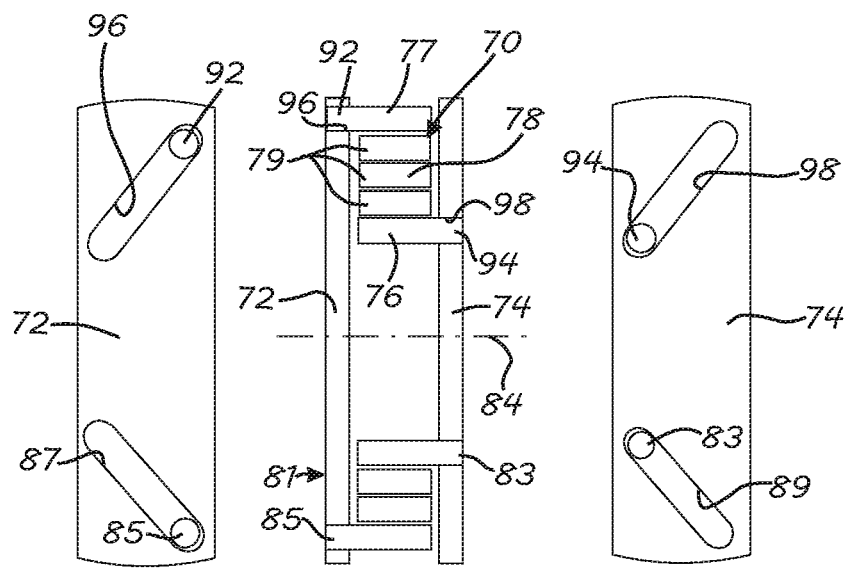
FIG. 5 is a schematic illustration of part of a product according to a number of variations.

In a number of variations as illustrated in FIG. 5, shown in schematic form, a clockspring type damper 70 may be disposed between a first torque transfer element 72 and a second torque transfer element 74. In the view of FIG. 5 a vertical cross section is illustrated in the middle with side views provided on either side of the vertical cross section. The damper 70 may include an inner end 76 and an outer end 77, with a coiled length 78 extending there between. The length 78 may be disposed between the torque transfer elements 72, 74 with a series of individual coils 79 in line between the inner end 76 and the outer end 77. The desirable motion for the coils 79 is a wrapping action of the length 78 over itself as load is applied through the torque transfer element 72 or an unwrapping motion as load is removed.

Figure 4:
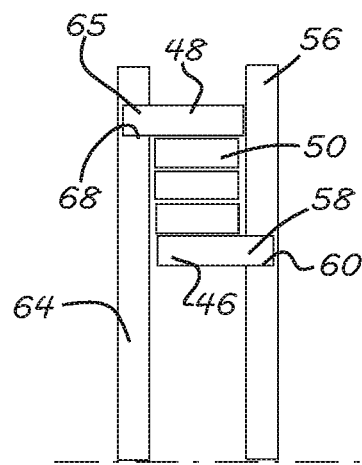
FIG. 4 is a schematic illustration of part of a product according to a number of variations.

With additional reference to FIG. 6, where an individual coil is depicted for descriptive purposes, this motion is primarily in a tangential direction 80 relative to the coiled length 78 but also with a small radial component 82 as the coils 79 move toward or away from the centerline of rotation (axis 84). Other motion outside of this direction may be undesirable. For example, should the coils 79 or a portion thereof, move radially with no tangential motion, individual coils 79 may contact one another. Such contact may result in noise or wear. Undesirable motion can also be a result of the way in which the damper 70 is loaded. When the outer end 77 and the inner end 76 may be loaded tangentially with a force, an unbalanced moment 86 may be generated. This moment 86 may cause an undesirable motion in which the damper 70 which may rotate about a midpoint between the inner end 76 and the outer end 77. In other words, the center 88 of the damper 70 may move, for example as indicated by reference number 90. To counteract any undesirable motion, the damper 70 may be engaged with the torque transfer elements 72, 74 through a pin 92, 94 and slot 96, 98 mechanism. The pin 92 at the outer end 77 may be engaged in and may slide within the slot 96. The pin 94 at the inner end 76 may be engaged and may slide within the slot 98. Allowing the ends 76, 77 to slide relative to the torque transfer elements 72, 74 may relieve the generation of undesirable motion. Alternatively, the pins 92, 94 may be fixed as shown in FIG. 4. At the opposite part 81 of the damper 70 across the axis 84 from the end 92, the length 78 may include one or more connections such as pins 83, 85. The pins 83, 85 may be fixed to the torque transfer element 72 and or 74, such as shown in FIG. 4, or may be disposed in slots, such as slots 87, 89. The connections, such as through the pins 83, 85 may be located at the midpoint of the length 78, or at any point, or points, along the length 78. The combination of fixed (pinned), or sliding (slotted) connections can be tailored to the application. For example, a sliding connection, as opposed to a fixed connection, may be provided between the power source and the damper 70, or between the power transmission system and the damper 70, or both. One or both of the ends 92, 94 of the length 78, may be provided with fixed connections and one or more of the intermediate points along the length may be provided with sliding connections, or the type of connection may be otherwise varied. The fixed/sliding element (pins) may be provided on the damper 70 or on the torque transfer elements 72, 74 or additional components such as blocks, may be provided between the damper 70 and the torque transfer elements 72, 74 for the pins and or slots.

In a number of variations as illustrated in FIG. 7, a damper 100 may be comprised of coil layers 102, 104, that may be made of different materials. A portion of the damper 100 coils, which are nearer the axis 106 may be only lightly stressed. Providing layers 102 of a material with higher stiffness increases the overall energy density of the damper 100. Examples of materials may include carbon fiber composite as the inner layers 102 and fiberglass as the outer layers 104, with the two bonded together. Other alternatives may include steel for the inner layers 102 with a fiberglass composite as the outer layers 104. A factor in choosing the material for the inner and outer layers 102, 104 is the Young's modulus of the material. With multiple layers, a first of the layers (such as layer 102), may be disposed consistently closer to the axis 106 than another of the layers (such as layer 104), at any point along the coil length of the damper 100. In one application, the stiffer material may be the inner layers 102, and the more flexible material the outer layers 104. Since the portion of the damper coils that is lightly stressed may be a majority of the thickness of each coil, the inner layers 104 may have a thickness 108 that is greater than the thickness 110 of the outer layers 104.

In a number of variations as illustrated in FIG. 8, one loop, or an individual coil of a damper 111 is shown. The damper 111 may be comprised of multiple layers, such as layers 112, 114, and 116. The multiple layers may be comprised of two or more different materials, and the number of individual layers may vary. For example, in the case of three layers, the middle layer 114 may be made of a material that has a relatively stiff properties, such metal, including steel, or a composite, such a carbon fiber composite, or another material. The layers 112 and 116 may be made of a different material or materials than the layer 114, which may have properties that are less stiff than the layer 114. For example the layers 112 and 116 may be made of the same or different material and may be a metal or composite or other material less stiff than the material of the layer 114, such as a fiberglass composite. With reference to FIG. 9, the diagrams illustrate stress horizontally, versus distance from the axis 120 vertically. The diagram on the left represents a clockspring damper with coils made of one material. The diagram on the right represents a clockspring damper with coils made of multiple material layers, such as shown in FIG. 8. The axis 120 represents the midpoint of the thickness of the middle layer 110. The results of the material property differences can be seen when moving up or down the y-axis 121 through the thickness of a section of one coil. As can be seen, stress is distributed more thoroughly through the thickness of each coil in a clockspring damper with coils made of multiple material layers. The thickness of the individual material layers may be varied to adjust the stress response as desired for a particular application.

Through the foregoing variations, a damper may enable a torque converter clutch to lock up in a vehicle under low speed and all firing fractions of the vehicle's engine, with efficient cost and mass. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a power source and a power transmission system. A coupling may be connected between the power source and the power transmission system. An engagement mechanism in the coupling may selectively provide a connection between the power source and the power transmission system. A damper may be included in the engagement mechanism through which the connection may be communicated. The damper may comprise a number of coils and may have a first end connected to the power source through the engagement mechanism and may have a second end connected to the power transmission system.

Variation 2 may include the product according to variation 1 wherein the engagement mechanism may include a lockup clutch that may have a piston that compresses a friction disk to effect the fixed connection.

Variation 3 may include the product according to variation 1 or 2 and may include a torque transfer element that may define a slot and may be connected to at least one of the power source or the power transmission system. The damper may include a pin on at least one of the first end or the second end and that is slidably engaged in the slot.

Variation 4 may include the product according to any of variations 1-3 wherein the coils may be comprised of a number of layers of different materials.

Variation 5 may include the product according to variation 4 wherein the coils may be disposed around an axis and wherein in each of the coils, a first of the layers may be closer to the axis than a second of the layers.

Variation 6 may include the product according to variation 5 wherein the first of the layers may be thicker than the second of the layers.

Variation 7 may include the product according to any of variations 1-6 wherein the coupling may be a torque converter that may have an impeller and a turbine. A stator may be disposed between the impeller and the turbine. The turbine may be fixedly connected to the power transmission system through an output shaft. The impeller may be fixedly connected to the power source through a housing section.

Variation 8 may include the product according to variation 7 wherein the damper may be releasably connected to the housing section through the engagement mechanism, and may be fixedly connected to the output shaft.

Variation 9 may involve a product that may include an input shaft and an output shaft. An engagement mechanism may provide a releaseable connection between the input shaft and the output shaft. An impeller and a turbine may provide a fluid connection between the input shaft and the output shaft. A damper may be connected in the releasable connection and may include a number of coils wound around an axis.

Variation 10 may include the product according to variation 9 wherein the engagement mechanism may comprise a lockup clutch that may have a piston that compresses a friction disk to connect the releaseable connection.

Variation 11 may include the product according to variation 9 or 10 and may include a torque transfer element that may define a slot. The torque transfer mechanism may be connected to at least one of the input shaft or the output shaft. The damper may include a pin that may be slidably engaged in the slot.

Variation 12 may include the product according to any of variations 9-11 wherein the coils may be comprised of a number of layers of different materials.

Variation 13 may include the product according to variation 12 wherein in each of the coils, a first of the layers may be disposed consistently closer to the axis than another of the layers at any point along the coil.

Variation 14 may include the product according to variation 13 wherein one of the first of the layers or the other layer may be thicker than the other of the layers, in comparison to each other.

Variation 15 may include the product according to any of variations 9-14 wherein the coupling may be a torque converter with a stator disposed between the impeller and the turbine. The turbine may be fixedly connected to the output shaft and the impeller may be fixedly connected to the input shaft.

Variation 16 may involve a product that may include a power source and a power transmission system. A coupling may be connected between the power source and the power transmission system. The coupling may have an engageable fixed connection that may be engageable to provide a fixed connection between the power source and the power transmission system and disengageable to release the power transmission system from the power source. A damper may be connected in the fixed connection and may comprise a length wound around an axis into a number of coils. A first end of the length may be selectively connected with the power source and a second end of the length may be fixedly connected to the power transmission system.

Variation 17 may include the product according to variation 16 and may include a clutch that may be connected between the first end and the power source.

Variation 18 may include the product according to variation 16 and may include a torque transfer element that may be connected to at least one of the power source or the power transmission system. The damper may be connected to the torque transfer element through a sliding connection.

Variation 19 may include the product according to any of variations 16-18 wherein each of the coils may comprise a first layer of a first material and a second layer of a second material different than the first material. At any point along the length of each of the coils, the entirety of the first layer may be closer to the axis than the second layer and may exhibit a greater stiffness than the second layer.

Variation 20 may include the product according to variation 19 wherein the first layer may be thicker than the second layer.

The above description of select variations within the scope of the invention is merely illustrative in nature and, thus, variations or variants thereof are not to be regarded as a departure from the spirit and scope of the invention.

What is claimed is:

1. A product comprising a power source, a power transmission system, a coupling connected between the power source and the power transmission system, an engagement mechanism in the coupling selectively providing a connection between the power source and the power transmission system, a damper in the engagement mechanism through which the connection is communicated, the damper comprising a number of coils with a first end connected to the power source through the engagement mechanism and a second end connected to the power transmission system and a torque transfer element defining a slot and connected to at least one of the power source or the power transmission system, wherein the damper includes a pin disposed on at least one of the first end or the second end and that is slidably engaged in the slot.

2. The product according to claim 1 wherein the engagement mechanism comprises a lockup clutch that has a piston that compresses a friction disk to effect the fixed connection.

3. The product according to claim 1 wherein the torque transfer element is configured so that the at least one of the first end or the second end slides relative to the torque transfer element to relieve motion of the damper.

4. The product according to claim 1 wherein the coils are comprised of a number of layers of different materials, each layer extending from the first end to the second end.

5. The product according to claim 4 wherein the coils are disposed around an axis and wherein in each of the coils, a first of the layers is closer to the axis than a second of the layers.

6. The product according to claim 5 wherein the first of the layers is thicker than the second of the layers.

7. The product according to claim 1 wherein the coupling is a torque converter that has an impeller, and a turbine, with a stator disposed between the impeller and the turbine, where the turbine is fixedly connected to the power transmission system through an output shaft and the impeller is fixedly connected to the power source through a housing section.

8. The product according to claim 7 wherein the damper is releasably connected to the housing section through the engagement mechanism, and is fixedly connected to the output shaft.

9. A product comprising an input shaft, an output shaft, an engagement mechanism providing a releaseable connection between the input shaft and the output shaft, an impeller and turbine providing a fluid connection between the input shaft and the output shaft, a damper connected in the releaseable connection, the damper comprising a number of coils wound around an axis, the coils terminating at a first end and a second end of the damper, and a torque transfer element defining a slot and connected to at least one of the input shaft or the output shaft, wherein the damper includes a pin on at least one of the first end or the second end, the pin slidably engaged in the slot configured so that the at least one of the first end or the second end slides relative to the torque transfer element to relieve motion of the damper.

10. The product according to claim 9 wherein the engagement mechanism comprises a lockup clutch that has a piston that compresses a friction disk to connect the releaseable connection.

11. The product according to claim 9 comprising a second torque transfer element, wherein the coils have a length from the first end to the second end and each coil along the length is disposed between the torque transfer elements.

12. The product according to claim 11 wherein the coils are comprised of a number of layers of different materials, the layers each extending from the first end to the second end.

13. The product according to claim 12 wherein in each of the coils, a first of the layers is disposed consistently closer to the axis than another of the layers at any point along the coil.

14. The product according to claim 13 wherein one of the first of the layers or the other layer is thicker in comparison to each other.

15. The product according to claim 9 wherein the coupling is a torque converter with a stator disposed between the impeller and the turbine, where the turbine is fixedly connected to the output shaft and the impeller is fixedly connected to the input shaft.

16. A product comprising a power source, a power transmission system, a coupling connected between the power source and the power transmission system, wherein the coupling has an engageable fixed connection, the engageable fixed connection engageable to provide a fixed connection between the power source and the power transmission system and disengageable to release the power transmission system from the power source, a damper connected in the fixed connection and comprising a length wound around an axis into a number of coils with a first end of the length selectively connected with the power source and a second end of the length fixedly connected to the power transmission system, a shaft connected with one of the power source or the power transmission system, a first torque transfer element connected with the shaft and extending radially from the shaft, a second torque transfer element extending radially and connectable with the other of the power source or the power transmission system, wherein the first end is connected with the first torque transfer element and the second end is connected with the second torque transfer element, and wherein at least one of the first or second ends is configured to slide relative to its connected torque transfer element.

17. The product according to claim 16 further comprising a clutch connected between the first end and the power source.

18. The product according to claim 16, wherein the first and second torque transfer elements comprise elongated plates that extend parallel to one another.

19. The product according to claim 16 wherein the damper comprises a clockspring with a length and each of the coils comprises a first layer of a first material and a second layer of a second material different than the first material, wherein the first and second layers extend along the clockspring in its entirety, wherein at any point along the length of each of the coils the entirety of first layer is closer to the axis than the second layer and exhibits a greater stiffness than the second layer.

20. The product according to claim 19 wherein the first layer is thicker than the second layer.

\* \* \* \* \*